April 18, 1950

R. FENNEMA 2,504,924

CONDUIT GATE VALVE

Filed Jan. 5, 1945

Inventor:
Richard Fennema
By Joseph O. Lange
Atty.

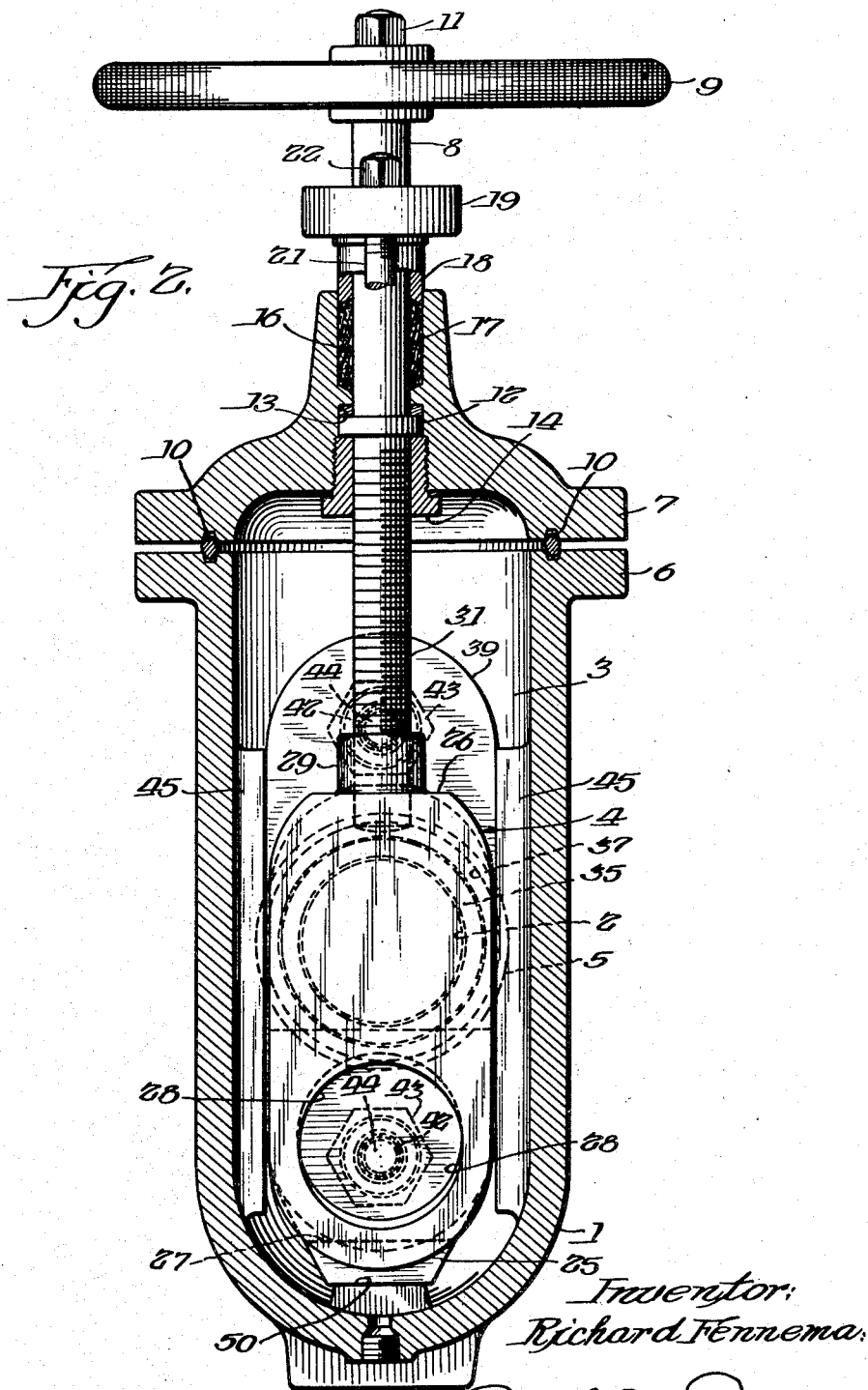

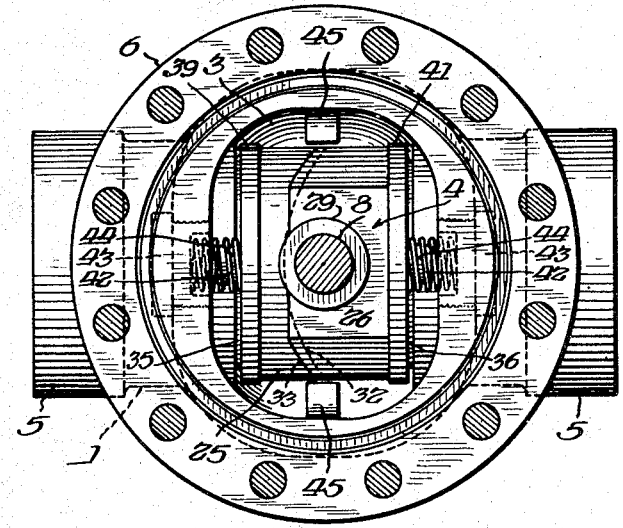

Patented Apr. 18, 1950

2,504,924

UNITED STATES PATENT OFFICE 2,504,924

CONDUIT GATE VALVE

Richard Fennema, Chicago, Ill., assignor to Crane Co., Chicago, Ill., a corporation of Illinois Application January 5, 1945, Serial No. 571,700

2 Claims. (Cl. 251—71)

This invention relates to a type of valve known to those skilled in the art as a conduit valve, in which the closure member in the open position of the valve does not expose the seating surfaces to contact with the fluid controlled by the valve and in which the closure member is normally encased in a chamber completely filled with a lubricant. It relates to the type of valve in which the movement of the closure member transfers a substantial portion of the lubricant from the lower portion to the upper portion of the chamber close to the valve and conversely from the upper portion to the lower portion of the chamber depending upon and opposite to the direction of the movement of the closure member, thereby supplying lubricant to the moving parts and the contact surfaces which are otherwise subjected to considerable wear during normal operation.

It is a more important object of this invention to provide for relatively easily installed guides and seats for the closure member, the guides restricting the closure member movement the entire length of its travel from the full open to the shut off or closed position.

Another important object is to provide an improved form of guide in which the latter is used to hold the valve discs together.

Another object lies in the provision of a guide for closure members in which the guides are resiliently supported within the casing thereby to hold the guide plates against the discs during all movements of the valve. The latter object eliminates the need for the use of a spring clip heretofore employed in this type of valve.

Another important object is to provide in combination therewith a novel form of disc closure member consisting of a pair of parts termed a floating half and a stem half disc in which a loose wedge member is employed therebetween and cooperating with the actuating stem whereby in the open position the stem serves as a stop for the wedge thereby forcing the discs apart to create a tight seating contact with the casing.

A further object is to provide a novel disc guide means in which the lubricant generally used in the valve is retained so as to guard against the usual losses during the course of normal service.

Other objects and advantages will become more readily apparent as the description hereinafter proceeds in connection with the accompanying drawings, in which Fig. 1 is a sectional assembly view of a valve employing a preferred embodiment of my invention.

Fig. 2 is a sectional assembly end view showing the general configuration of the combined closure member and guides.

Fig. 3 is a fragmentary sectional view taken on the line 3—3 of Fig. 1.

Fig. 4 is a front view of the floating half disc.

Fig. 5 is a sectional view taken on the line 5—5 of Fig. 4.

Fig. 6 is a front view of the novel wedge member.

Fig. 7 is a sectional view taken on the line 7—7 of Fig. 6.

Fig. 8 is a front view of the stem half disc.

Fig. 9 is a sectional view taken on the line 9—9 of Fig. 8.

Figure 1:
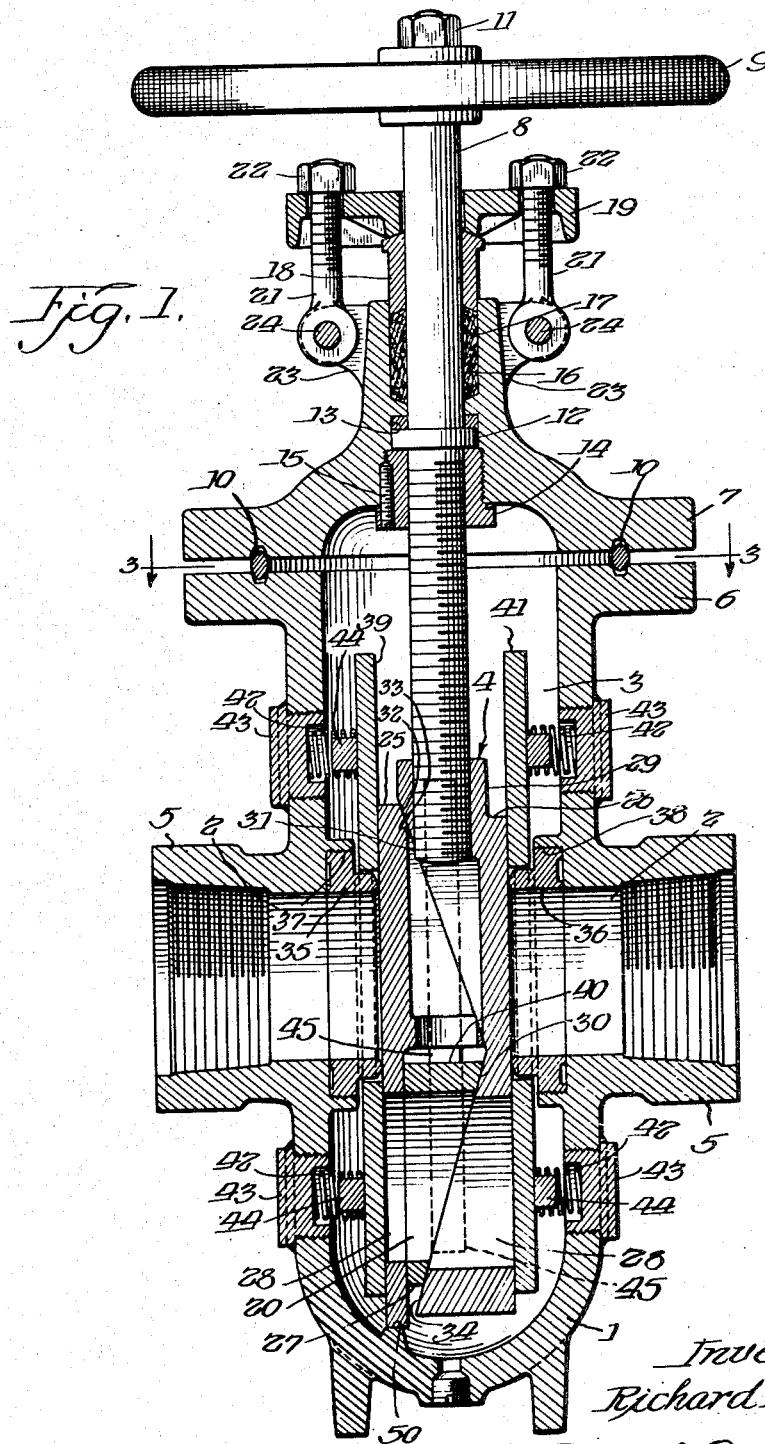

Referring now to Fig. 1, a valve body or casing 1 is shown having a fluid passageway 2 therethrough and a central valve chamber 3 therebetween encasing the combined closure member unit 4. At each end of the passageway 2, connecting pipe ends 5 are provided to secure the valve casing to the usual pipe line. Obviously other well known methods of attaching the valve to a pipe line may be used, if desired. At the upper end of the valve chamber 3 and preferably integral with the casing 1, a bonnet flange 6 is provided to which may be attached a bonnet or cover 7 by means of bolts (not shown) extending therethrough and compressing a gasket 10 retained by coaligning annular grooves in the adjacent faces of the flange 6 and the bonnet 7. Through the bonnet 7 the journaling valve stem 8 is positioned, the upper and exposed end of which has attached thereto the handwheel 9 by means of the nut 11, the other end portion of the stem being screw threadedly attached as indicated to a portion of the closure member 4 as hereinafter described in greater detail.

The valve herein shown for purposes of illustration is of the non-rising stem type, in which by rotation of the handwheel 9, the stem 8 revolves in the bonnet 7, the stem being restricted in its axial movement by the integral collar 12 which is retained within the bonnet recess 13 by the stem hole bushing 14, the latter member being screw threaded into the bonnet recess and preferably keyed by means of the screw 15 to prevent accidental removal. In order to prevent line leakage past the stem bearing, the stuffing box 16 is formed with the upper portion of the bonnet 7, the stuffing box being filled with the usual compressible packing 17 retained within the stuffing box by the gland 18 upon which the flange 19 bears and which is secured to the bonnet 7 by means of the bolts and nuts 21 and 22, respectively, pivotally attached to the bonnet lugs or bifurcated ears 23 by means of the pin 24 passing therethrough. The foregoing description is a general one applicable to a conventional type of gate valve.

Directing attention now to that particular structure embodying my invention, it should be noted that the closure member unit generally referred to previously as 4 consists essentially of three parts, namely; a floating half disc 25 and a stem half disc 26 and with a loose wedge member 27 positioned therebetween. A common passage 28 is provided at the lower portion of each of the members 25 and 26 and substantially coincides with the passage 20 of the wedge 27. Preferably, although not necessarily, the contact surfaces of the discs are made plain but if desired they may be furnished with suitable disc facings in order to effect seat tightness, depending upon the line service condition encountered and without in any way adversely affecting the scope of this invention. At the upper portion of the stem half disc 26, a boss 29 preferably integral therewith is provided for the reception of the stem threads 31 of the stem 8. Each of the disc halves 25 and 26, as indicated, is provided with the inclined or wedge surfaces respectively designated 32 and 33, the stem half disc 26 having the additional surface 34 for engagement by the inclined surface 30 of the wedge 27. The detailed functioning of the respective wedge surfaces in cooperation with the stem and the wedge member will be hereinafter described in detail.

Preferably, although not necessarily, the valve casing 1 may have separate valve seats 35 and 36 of annular form which may be threadedly attached as indicated at 37 and 38 respectively. These valve seats serve as the means of contact with the plain surfaces of the disc half members 25 and 26 in the course of the longitudinal movement of the latter between the open and closed positions of the valve. Loosely fitted over the inner reduced end portions of each of the seats 35 and 36, the disc guide plates 39 and 41 are provided. The thickness of the guide plates is preferably made to such dimensions as to permit the inner end of the seats to project therethrough, as indicated, and thereby to form the contact with each of the plain surfaces of the respective disc half members 25 and 26. As to the positioning of the guide plates 39 and 41 within the casing, it has been found desirable to resiliently support the latter members relative to the casing by the interposition of the resilient means, such as the compression springs 42, preferably although not necessarily arranging for such positioning thereon by means of the inserted plugs 43. The guide plates 39 and 41 are provided with the extensions 44 upon which the springs 42 may be mounted. In order to guide the discs accurately during their reciprocatory movement and guard against objectionable side play, the casing 1 is preferably provided with the integral guides 45. The latter guides may of course be provided as separate pieces, either weld mounted or otherwise suitably attached to the casing instead of being made integral therewith. Obviously the latter arrangement is simply a matter of choice, depending upon the service or operating conditions encountered including consideration of cost factors.

As to the details of operation, assuming the valve to be in the closed position as shown in Fig. 1 and it is desired to open the valve, the handwheel 9 is rotated in a counterclockwise direction when looking down upon the valve, thus causing the stem half disc 26 to move initially upward upon the stem threads 31. The immediate effect of the counterclockwise rotation of the stem 8 is twofold: first, the stem half disc member 26 proceeds to climb upwardly upon the stem threads 31 and thereby breaks the contact between the respective wedge surfaces at 32 and 33; second, this has the simultaneous effect of moving the floating disc 25 upwardly carrying the wedge member 27 with it while being supported on the surface 34 of the stem half disc 26. Such movement continues upward until in the open position, that is when the respective ports 28 of the respective discs 25 and 26 and the wedge 27 are in alignment with the passage 2 and the apertures of the seats 35 and 36, the lower threaded end of the stem strikes the upper portion 40 of the wedge and the discs are then forced apart by the wedge member so as to form a relatively unbroken surface in the combined passages 28 extending therethrough. Thus as illustrated in Fig. 1, in the seated position of the valve the disc 25 is stopped at the lower portion of the casing by striking the lug 50 of the valve body, and as the stem continues to rotate, the disc member 26 moves along the inclined or wedge surface 32 and thereby moves the disc 25 outwardly therefrom to make the contact against its seat 35. Similarly and by the same action, the disc member 26 makes suitable contact with the seat 36.

Other forms of wedge members have been employed previously in this type of valve but it is not believed that anyone has done so with the same simplicity and relative economy as embodied in this invention. In cooperation with the novel form of disc, the spring mounted guides reduce or minimize leakage losses of the lubricant generally employed in this type of valve. At the same time by employing a construction in which the guides are resiliently mounted, the necessity heretofore for using spring members between the discs has been overcome, avoiding the relatively complicated applications subject to troubles and complaints in the field.

It should be further apparent that while a single complete combination or embodiment of this invention has been described, various features of the invention may be independently employed and numerous changes may be devised without departing from the spirit and scope of the invention as described above and claimed herein.

I claim:

1. In a conduit type of gate valve, a casing having inlet and outlet passages and having seating means cooperating with said inlet and outlet passages, a ported closure member movable into position to connect the said passages and to form a continuation of such passages through the casing and to disconnect the said passages, a stem for reciprocably moving the closure member, the said closure member including a plurality of discs comprising a floating half disc and a half disc connected to the said stem having a lower ported portion and having pairs of oppositely inclined surfaces therebetween with a pair of the inclined surfaces functioning during the opening and closing movement of the valve, tapering wedge means for the closure member supported at a lower portion of the disc having the stem connection, another pair of inclined surfaces cooperating with the said wedge means during the closing of the valve to spread apart the discs of the closure member, resiliently mounted apertured guide means within the casing for contact with the seating faces of the said closure member, the said guide means having plain surfaces in substantially the same vertical plane as the seating means of the casing, whereby the contact of the closure member with the casing adjacent the passages is supplemented by the contacts provided by the plain surfaces of the said guide means with the said closure member, the said casing having means on each side of the inlet and outlet passages for support of end portions of the said resiliently mounted guide means.

2. In a conduit type of gate valve, a casing having inlet and outlet passages and having seating means cooperating with said passages, a ported closure member respectively movable into position to connect the said passages and to form a continuation of said passages through the casing and to disconnect said passages, a threaded stem for reciprocably moving the said closure member, the said closure member including a plurality of discs comprising a floating half disc and a half disc threadedly connected to the said stem having a lower portion, the said latter disc having pairs of oppositely inclined surfaces therebetween with a pair of the latter surfaces functioning to retract the disc during the open position of the valve, another pair functioning to spread the discs during the closing of the valve, ported wedge means between the discs supported at a lower portion of the disc having the stem connection, the threaded end portion of the stem moving longitudinally past the floating half disc during the opening movement of the closure member, a pair of inclined surfaces between said wedge means and the said stem connected disc cooperating with the ported wedge means during the closing of the valve to spread apart the lower ported portion of said stem connected disc, at least one of the discs having a pair of oppositely inclined surfaces, guide means within the casing for the said closure member resiliently mounted relative to the said casing and to the said closure member, the lower end portion of the threaded stem in the wide open position of the closure member bearing against an upper surface of the ported wedge means whereby the said discs are forced apart to form a relatively unbroken passage between the casing passages, the wedge port and a passage of the stem connected disc, the said guide means having plain surface portions in substantially the same vertical plane as the seating means of the casing for engagement with the said closure member to guide the closure member in the open and closing operations of the valve, one of the discs having contact with one of the wedge surfaces of the other disc, the said wedge means contacting with the other wedge surface of the latter mentioned disc, the said casing having renewable means on each side of the inlet and outlet passages for transverse support of end portions of the said resiliently mounted guide means.

RICHARD FENNEMA.

REFERENCES CITED

The following references are of record in the file of this patent:

UNITED STATES PATENTS

| Number | Name | Date |
| --- | --- | --- |
| 338,275 | Kennedy | Mar. 23, 1886 |
| 1,328,098 | Palmer | Jan. 13, 1920 |
| 1,803,889 | Bohnhardt | May 5, 1931 |
| 1,813,100 | Swindle | July 7, 1931 |
| 1,875,035 | Law | Aug. 30, 1932 |
| 1,981,279 | Mueller | Nov. 20, 1934 |
| 2,002,780 | Laurent | May 28, 1935 |
| 2,030,458 | McKellar | Feb. 11, 1936 |
| 2,148,628 | Laurent | Feb. 28, 1939 |
| 2,192,331 | Schaefer | Mar. 5, 1940 |
| 2,230,600 | Olson | Feb. 4, 1941 |
| 2,276,620 | Harrington | Mar. 17, 1942 |